US006869100B2

(12) United States Patent
Breed et al.

(10) Patent No.: US 6,869,100 B2
(45) Date of Patent: *Mar. 22, 2005

(54) METHOD AND APPARATUS FOR CONTROLLING AN AIRBAG

(75) Inventors: David S. Breed, Boonton Township, Morris County, NJ (US); Wilbur E. DuVall, Kimberling City, MO (US); Wendell C. Johnson, Signal Hill, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 76 days.

This patent is subject to a terminal disclaimer.

(21) Appl. No.: 10/234,067

(22) Filed: Sep. 3, 2002

(65) Prior Publication Data

US 2003/0001368 A1 Jan. 2, 2003

Related U.S. Application Data

(63) Continuation-in-part of application No. 09/778,137, filed on Feb. 7, 2001, now Pat. No. 6,513,830, which is a continuation of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned.

(51) Int. Cl.$^7$ ............................................. B60R 21/32
(52) U.S. Cl. ...................................................... 280/735
(58) Field of Search ................................ 280/734, 735; 701/45

(56) References Cited

U.S. PATENT DOCUMENTS

| 3,275,975 A | 9/1966 | King ............................. 340/1 |
| 3,974,350 A | 8/1976 | Breed ......................... 200/61 |
| 4,198,864 A | 4/1980 | Breed ......................... 73/492 |
| 4,284,863 A | 8/1981 | Breed ..................... 200/61.53 |
| 4,329,549 A | 5/1982 | Breed ................. 200/61.45 M |
| 4,573,706 A | 3/1986 | Breed ......................... 280/734 |
| 4,625,329 A | 11/1986 | Ishikawa et al. ............... 382/1 |
| 4,683,373 A | 7/1987 | Tupman ..................... 180/272 |

(List continued on next page.)

FOREIGN PATENT DOCUMENTS

| DE | 3737554 | 5/1989 | |
| DE | 4112579 | 10/1991 | |
| DE | 4023109 | 1/1992 | |
| JP | 3-159838 | 7/1991 | |
| WO | 94/22693 | 10/1994 | ............... 280/735 |
| WO | 01/04648 | 1/2001 | |

*Primary Examiner*—Ruth Ilan
(74) *Attorney, Agent, or Firm*—Brian Roffe

(57) ABSTRACT

Method and system for controlling deployment of an airbag in which the position of an occupant to be protected by deployment of the airbag is determined, the probability that a crash requiring deployment of the airbag is occurring is assessed and deployment of the airbag enabled in consideration of the determined position of the occupant and the assessed probability that a crash is occurring. Deployment of the airbag may be enabled by analyzing the assessed probability relative to a pre-determined threshold whereby deployment of the airbag is enabled only when the assessed probability is greater than the threshold. The threshold may be adjusted based on the determined position of the occupant.

62 Claims, 9 Drawing Sheets

U.S. PATENT DOCUMENTS

| | | | |
|---|---|---|---|
| 4,900,880 A | 2/1990 | Breed | 200/61.45 M |
| 4,933,515 A | 6/1990 | Behr et al. | 200/61.45 M |
| 4,995,639 A | 2/1991 | Breed | 280/735 |
| 5,071,160 A | 12/1991 | White | 280/735 |
| 5,074,583 A | 12/1991 | Fujita | 280/735 |
| 5,118,134 A | 6/1992 | Mattes | 280/735 |
| 5,161,820 A | 11/1992 | Vollmer | 280/730 |
| 5,184,845 A | 2/1993 | Omura | 280/735 |
| 5,232,243 A | 8/1993 | Blackburn et al. | 280/732 |
| 5,330,226 A | 7/1994 | Gentry et al. | 280/735 |
| 5,366,241 A | 11/1994 | Kithil | 280/735 |
| 5,377,108 A | 12/1994 | Nishio | 364/424.05 |
| 5,398,185 A | 3/1995 | Omura | 364/424.05 |
| 5,413,378 A | 5/1995 | Steffens, Jr. et al. | 280/735 |
| 5,439,249 A | 8/1995 | Steffens, Jr. et al. | 280/735 |
| 5,446,661 A | 8/1995 | Gioutsos et al. | 364/424.05 |
| 5,454,591 A | 10/1995 | Mazur et al. | 280/735 |
| 5,474,327 A | 12/1995 | Schousek | 280/735 |
| 5,528,698 A | 6/1996 | Kamei et al. | 382/100 |
| 5,573,269 A | 11/1996 | Gentry et al. | 280/735 |
| 5,585,625 A | 12/1996 | Spies | 250/221 |
| 5,602,734 A | 2/1997 | Kithil | 364/424.055 |
| 5,636,864 A | 6/1997 | Hori | 280/735 |
| 5,653,462 A | 8/1997 | Breed et al. | 280/735 |
| 5,670,853 A | 9/1997 | Bauer | 318/286 |
| 5,683,103 A | 11/1997 | Blackburn et al. | 280/735 |
| 5,722,686 A | 3/1998 | Blackburn et al. | 280/735 |
| 5,732,375 A | 3/1998 | Cashler | 701/45 |
| 5,758,301 A | 5/1998 | Saito et al. | 701/45 |
| 5,770,997 A | 6/1998 | Kleinberg et al. | 340/438 |
| 5,785,347 A | 7/1998 | Adolph et al. | 280/735 |
| 5,801,619 A | 9/1998 | Liu et al. | 340/436 |
| 5,848,802 A | 12/1998 | Breed et al. | 280/735 |
| 5,890,085 A | 3/1999 | Corrado et al. | 701/47 |
| 5,906,393 A | 5/1999 | Mazur et al. | 280/735 |
| 5,948,031 A | 9/1999 | Jinno et al. | 701/45 |
| 5,964,478 A | 10/1999 | Stanley et al. | 280/735 |
| 6,014,602 A | 1/2000 | Kithil et al. | 701/45 |
| 6,018,693 A | 1/2000 | Blackburn et al. | 701/45 |
| 6,020,812 A | 2/2000 | Thompson et al. | 340/438 |
| 6,026,340 A | 2/2000 | Corrado et al. | 280/735 |
| 6,029,105 A | 2/2000 | Schweizer | 701/45 |
| 6,039,139 A | 3/2000 | Breed et al. | 280/735 |
| 6,079,738 A | 6/2000 | Lotito et al. | 280/735 |
| 6,161,070 A | 12/2000 | Jinno et al. | 701/45 |

METHOD AND APPARATUS FOR CONTROLLING AN AIRBAG

CROSS REFERENCE TO RELATED APPLICATIONS

This application is a continuation-in-part of U.S. patent application Ser. No. 09/778,137 filed Feb. 7, 2001, now U.S. Pat. No. 6,513,830, which in turn is a continuation of U.S. patent application Ser. No. 08/905,877 filed Aug. 4, 1997, now U.S. Pat. No. 6,186,537, which in turn is a continuation of U.S. patent application Ser. No. 08/505,036 filed Jul. 1, 1995, now U.S. Pat. No. 5,653,462, which in turn is a continuation of U.S. patent application Ser. No. 08/040,978 filed Mar. 31, 1993, now abandoned, which in turn is a continuation-in-part of U.S. patent application Ser. No. 07/878,571 filed May 5, 1992, now abandoned.

FIELD OF THE INVENTION

The present invention relates to methods and apparatus for disabling an airbag system in a motor vehicle if the seating position is unoccupied or an occupant is out-of-position, i.e., closer to the airbag door than a predetermined distance.

BACKGROUND OF THE INVENTION

Crash sensors for determining that a vehicle is in a crash of sufficient magnitude as to require the deployment of an inflatable restraint system, or airbag, are either mounted in a portion of the front of the vehicle which has crushed by the time that sensor triggering is required, the crush zone, or elsewhere such as the passenger compartment, the non-crush zone. Regardless of where sensors are mounted there will always be crashes where the sensor triggers late and the occupant has moved to a position near to the airbag deployment cover. In such cases, the occupant may be seriously injured or even killed by the deployment of the airbag. This invention is largely concerned with preventing such injuries and deaths by preventing late airbag deployments.

In a Society of Automotive Engineers (SAE) paper by Mertz, Driscoll, Lenox, Nyquist and Weber titled "Response of Animals Exposed to Deployment of Various Passenger Inflatable Restraint System Concepts for a Variety of Collision Severities and Animal Positions" SAE 826074, 1982, the authors show that an occupant can be killed or seriously injured by the airbag deployment if he or she is located out of position near or against the airbag when deployment is initiated. These conclusions were again reached in a more recent paper by Lau, Horsch, Viano and Andrzejak titled "Mechanism of Injury From Air Bag Deployment Loads", published in Accident Analysis & Prevention, Vol. 25, No. 1, 1993, Pergamon Press, New York, where the authors conclude that "Even an inflator with inadequate gas output to protect a properly seated occupant had sufficient energy to induce severe injuries in a surrogate in contact with the inflating module." These papers highlight the importance of preventing deployment of an airbag when an occupant is out of position and in close proximity to the airbag module.

The Ball-in-Tube crush zone sensor, such as disclosed in U.S. Pat. Nos. 4,974,350; 4,198,864; 4,284,863; 4,329,549, 4,573,706 and 4,900,880 to D S. Breed, has achieved the widest use while other technologies, including magnetically damped sensors as disclosed in U.S. Pat. No. 4,933,515 to Behr et al and crush switch sensors such as disclosed in U.S. Pat. No. 4,995,639 to D S. Breed, are now becoming available. Other sensors based on spring-mass technologies are also being used in the crush zone. Crush zone mounted sensors, in order to function properly, must be located in the crush zone at the required trigger time during a crash or they can trigger late. One example of this was disclosed in a Society of Automotive Engineers (SAE) paper by D. S. Breed and V. Castelli titled "Trends in Sensing Frontal Impacts", SAE 890750, 1989, and further in U.S. Pat. No 4,900,880. In impacts with soft objects, the crush of a vehicle can be significantly less than for impacts with barriers, for example. In such cases, even at moderate velocity changes where an airbag might be of help in mitigating injuries, the crush zone mounted sensor might not actually be in the crush zone at the time that sensor triggering is required for timely airbag deployment, and as a result can trigger late when the occupant is already resting against the airbag module.

There is a trend underway toward the implementation of Single Point Sensors (SPS) which are typically located in the passenger compartment. In theory, these sensors use sophisticated computer algorithms to determine that a particular crash is sufficiently severe as to require the deployment of an airbag. In another SAE paper by Breed, Sanders and Castelli titled "A Critique of Single Point Sensing", SAE 920124, 1992, which is incorporated herein by reference, the authors demonstrate that there is insufficient information in the non-crush zone of the vehicle to permit a decision to be made to deploy an airbag in time for many crashes. Thus, sensors mounted in the passenger compartment or other non-crush zone locations, will also trigger the deployment of the airbag late on many crashes.

A crash sensor is necessarily a predictive device. In order to inflate the airbag in time, the inflation must be started before the full severity of the crash has developed. All predictive devices are subject to error, so that sometimes the airbag will be inflated when it is not needed and at other times it will not be inflated when it could have prevented injury. The accuracy of any predictive device can improve significantly when a longer time is available to gather and process the data. One purpose of the occupant position sensor is to make possible this additional time in those cases where the occupant is farther from the steering wheel when the crash begins and/or where, due to seat belt use or otherwise, the occupant is moving toward the steering wheel more slowly In these cases the decision on whether to deploy the airbag can be deferred and a more precise determination made of whether the airbag is needed.

The discussions of timely airbag deployment above are all based on the seating position of the average male (the so called 50% male) relative to the airbag or steering wheel. For the 50% male, the sensor triggering requirement is typically calculated based on an allowable motion of the occupant of 5 inches before the airbag is fully inflated. Airbags typically require about 30 milliseconds of time to achieve full inflation and, therefore, the sensor must trigger inflation of the airbag 30 milliseconds before the occupant has moved forward 5 inches. The 50% male, however, is actually the 70% person and therefore about 70% of the population sit on average closer to the airbag than the 50% male and thus are exposed to a greater risk of interacting with the deploying airbag. A recent informal survey, for example, found that although the average male driver sits about 12 inches from the steering wheel, about 2% of the population of drivers sit closer than 6 inches from the steering wheel and 10% sit closer than 9 inches. Also, about 1% of drivers sit at about 24 inches and about 16% at least 18 inches from the steering wheel. None of the sensor systems now on the market take account of this variation in occupant seating position and yet this can have a critical effect on the sensor required maximum triggering time.

For example, if a fully inflated airbag is about 7 inches thick, measured from front to back, then any driver who is seated closer than 7 inches will necessarily interact with the deploying airbag and the airbag probably should not be deployed at all. For a recently analyzed 30 mph barrier crash of a mid-sized car, the sensor required triggering time, in order to allow the airbag to inflate fully before the driver becomes closer than 7 inches from the steering wheel, results in a maximum sensing time of 8 milliseconds for an occupant initially positioned 9 inches from the airbag, 25 milliseconds at 12 inches, 45 milliseconds at 18 inches and 57 milliseconds for the occupant who is initially positioned at 24 inches from the airbag. Thus for the same crash, the sensor required triggering time varies from a no trigger to 57 milliseconds, depending on the initial position of the occupant. A single sensor triggering time criterion that fails to take this into account, therefore, will cause injuries to small people or deny the protection of the airbag to larger people. A very significant improvement to the performance of an airbag system will necessarily result from taking the occupant position into account as described herein.

A further complication results from the fact that a greater number of occupants are now wearing seatbelts which tends to prevent many of these occupants from getting too close to the airbag. Thus, just knowing the initial position of the occupant is insufficient and either the position must be continuously monitored or the seatbelt use must be known. Also, the occupant may have fallen asleep or be unconscious prior to the crash and be resting against the steering wheel. Some sensor systems have been proposed that double integrate the acceleration pulse in the passenger compartment and determine the displacement of the occupant based on the calculated displacement of an unrestrained occupant seated at the mid seating position. This sensor system then prevents the deployment of the airbag if, by this calculation, the occupant is too close to the airbag. This calculation can be greatly in error for the different seating positions discussed above and also for the seatbelted occupant, and thus an occupant who wears a seatbelt could be denied the added protection of the airbag in a severe crash.

As the number of vehicles which are equipped with airbags is now rapidly increasing, the incidence of late deployments is also increasing. It has been estimated that out of approximately 400 airbag related complaints to the National Highway Traffic Safety Administration (NHTSA) through 1991, for example, about 5% to 10% involved burns and injuries which were due to late airbag deployments. There is also at least three known fatalities where a late airbag deployment is suspected as the cause.

The need for an occupant position sensor has been observed by others and several methods have been disclosed in U.S. patents for determining the position and velocity of an occupant of a motor vehicle. Each of these systems, however, have significant limitations. In White et al., U.S. Pat. No. 5,071,160, for example, a single acoustic sensor and detector is disclosed and illustrated mounted lower than the steering wheel. White et al correctly perceive that such a sensor could be defeated, and the airbag falsely deployed, by an occupant adjusting the control knobs on the radio and thus they suggest the use of a plurality of such transmitter/receivers. If a driver of a vehicle is seated one foot from the transmitter/receiver, and using 1128 feet per second as the velocity of sound, it would require approximately 2 milliseconds for the sound to travel to the occupant and return. The use of the same device to both transmit and detect the sound waves requires that the device cannot send and receive simultaneously and therefore it requires at least 2 milliseconds to obtain a single observation of the occupant's position. Naturally as the distance from the occupant to the sensor increases, the observation rate further decreases. For a passenger sitting two feet from the sensor, the delay is approximately 4 milliseconds Sensors of this type can be used to accurately obtain the initial position of the occupant but the determination of the occupant's velocity, and thus the prediction of when he/she is likely to be too close to the deploying airbag, will necessarily be inaccurate due to the long delay between position points and thus the small number of such points available for the prediction and the inherent noise in the reflected signal.

Mattes et al., in U.S. Pat. No. 5,118,134, disclose a single ultrasonic transmitter and a separate receiver, but, no description is provided as to the manner in which this combination is used. In conventional ultrasonic distance measuring systems, the transmitter emits a burst of ultrasonic waves and then measures the time required for the waves to bounce off the object and reach the receptor. The transmitter does not transmit again until the waves have been received by the receiver. This system again suffers from the time delay of at least 2 to 4 milliseconds described above.

Doppler techniques can be used to determine the velocity of the occupant as disclosed below. Both White et al and Mattes et al, however, specifically state that the occupant's velocity is determined from a succession of position measurements. The use of the Doppler effect is disclosed in U.S. Pat. No. 3,275,975 to King, but only to determine that the occupant is not moving. No attempt is made by King to measure the velocity of the occupant toward an airbag using this effect. Also none of the references above disclose the use of an ultrasonic transmitter and receiver to simultaneously determine the position and velocity of the occupant using a combination of the transmission time and the Doppler effect as disclosed below.

The object of an occupant position sensor is to determine the location of the head and/or chest of the vehicle occupant relative to the airbag since it is the impact of either the head or chest with the deploying airbag which can result in serious injuries. For the purposes herein, therefore, whenever the position of the occupant is referenced it will mean the position of the head or chest of the occupant and not that of his/her arms, hands or legs. The preferred mounting of the ultrasonic transmitters, therefore, are those locations which have the clearest unimpeded view of the occupant's head and chest. These locations are generally at the top of the dashboard, the windshield, the headliner above the windshield and the rear view mirror. Both White et al. and Mattes et al. disclose only lower mounting locations of the ultrasonic transmitters such as on the dashboard or below the steeling wheel. Both such mounting locations are particularly prone to detection errors due to positioning of the occupant's hands, arms and legs. This would require at least three, and preferably more, such sensors and detectors and an appropriate logic circuitry for the case where the driver's arms are the closest objects to two of the sensors. When an unimpeded view is not possible, some means of pattern recognition, which is not disclosed in the above references, is required to differentiate between the occupant and his/her extremities such as his/her hands, arms or legs.

Mattes et al. further disclose the placement of the sensor in the headrest but such an arrangement is insufficient since it measures the distance from the headrest to the occupant and not from the airbag.

White et al. discloses the use of error correction circuitry to differentiate between the velocity of one of the occupant's hands as in the case where he/she is adjusting the knob on the radio and the remainder of the occupant. Three ultrasonic sensors of the type disclosed by White et al. would accomplish this differentiation if two of them indicated that the occupant was not moving while the third was indicating that he or she was. Such a combination, however, would not differentiate between an occupant with both hands and arms in the path of the ultrasonic transmitter at such a location that it was blocking a substantial view of the occupant's head or chest. Since the sizes and driving positions of occupants are extremely varied, pattern recognition systems are required when a clear view of the occupant, unimpeded by his/her extremities, cannot be guaranteed. Pattern recognition systems for the occupant as used here means any system which will differentiate between the occupant and his extremities based on relative size, position or shape. Pattern recognition systems can also be used to differentiate an occupant from a seat or a bag of groceries also based on relative size, position or shape or even on passive infrared radiation, as described below.

OBJECTS AND SUMMARY OF THE INVENTION

The occupant position sensor of this invention is adapted for installation in the passenger compartment of an automotive vehicle equipped with a passenger protective device such as an inflatable airbag. When the vehicle is subjected to a crash of sufficient magnitude as to require deployment of the passive protective device, and the sensor system has determined that the device is to be deployed, the occupant position sensor and associated electronic circuitry determines the position of the vehicle occupant relative to the airbag and disables deployment of the airbag if the occupant is positioned so that he/she is likely to be injured by the deploying airbag. Naturally, as discussed below, the addition of an occupant position sensor onto a vehicle leads to other possibilities such as the monitoring of the driver's behavior which can be used to warn a driver if he or she is falling asleep, or to stop the vehicle if the driver loses the capacity to control the vehicle.

According to a preferred implementation, an ultrasonic generator transmits a burst of ultrasonic waves which travel to the occupant and are reflected back to a receptor, which may be the same device as the generator. The time period required for the waves to travel from the generator and return is used to determine the position of the occupant and the frequency shift of the waves is used to determine the velocity of the occupant relative to the airbag.

In another preferred implementation, infrared light is used to illuminate the occupant and lenses are used to focus images of the occupant onto arrays of charge coupled devices (CCD). Outputs from the CCD arrays are analyzed by appropriate logic circuitry to determine the position and velocity of the occupant's head and chest.

In yet another preferred implementation, a beam of radiation is moved back and forth across the occupant illuminating various portions of the occupant and with appropriate algorithms the position of the occupant in the seat is accurately determined.

It is an object of the present invention to provide a method and apparatus for vehicle crash discrimination and control of a safety restraint having increased efficiency and reliability in actuating or deploying the safety restraint such as an airbag.

It is another object of the present invention to provide a method and system for vehicle crash discrimination and control of a safety restraint which continuously detects various vehicle occupant positions for optimizing a discrimination analysis to achieve increased efficiency and reliability in actuating the safety restraint.

It is another object of the present invention to provide a method and system for discriminating vehicle crashes and control of a safety restraint which adjusts a decision period used for determining when to actuate the safety restraint, wherein the adjustments are based on the position of the occupant.

It is another object of this invention to provide an occupant position sensor which reliably permits, and in a timely manner, a determination to be made that he/she is out of position, or will become out of position, and likely to be injured by a deploying airbag.

It is also an object of this invention to provide a system which will accurately discriminate between the occupant's head or chest and other parts of the body in determining the occupant's position and velocity.

It is another object of this invention to independently prevent the deployment of the driver or passenger airbags if either occupant is out of position.

It is still another object of this invention to provide for a more complete analysis of an occupant through the use of CCD's to capture more of the occupant's image.

Another object of this invention is to provide a warning to a driver if he/she is falling asleep.

Still another object of this invention is to sense that a driver is inebriated or otherwise suffering from a reduced capacity to operate a motor vehicle and to take appropriate action.

In order to achieve one or more of these objects, a method for controlling deployment of an airbag comprises the steps of determining the position of an occupant to be protected by deployment of the airbag, assessing the probability that a crash requiring deployment of the airbag is occurring and enabling deployment of the airbag in consideration of the determined position of the occupant and the assessed probability that a crash is occurring. Deployment of the airbag may be enabled by analyzing the assessed probability relative to a predetermined threshold whereby deployment of the airbag is enabled only when the assessed probability is greater than the threshold. The threshold may be adjusted based on the determined position of the occupant.

The position of the occupant may be determined in various ways including by receiving and analyzing waves from a space in a passenger compartment of the vehicle occupied by the occupant, transmitting waves to impact the occupant, receiving waves after impact with the occupant and measuring time between transmission and reception of the waves, obtaining two or three-dimensional images of a passenger compartment of the vehicle occupied by the occupant and analyzing the images with an optional focusing of the images prior to analysis, or by moving a beam of radiation through a passenger compartment of the vehicle occupied by the occupant. The waves may be ultrasonic, radar, electromagnetic, passive infrared, and the like, and capacitive in nature. In the latter case, a capacitance or capacitive sensor may be provided. An electric field sensor could also be used.

Deployment of the airbag can be disabled when the determined position is too close to the airbag The rate at which the airbag is inflated and/or the time in which the airbag is inflated may be determined based on the determined position of the occupant.

Another method for controlling deployment of an airbag comprises the steps of determining the position of an occupant to be protected by deployment of the airbag and adjusting a threshold used in a sensor algorithm which enables or suppresses deployment of the airbag based on the determined position of the occupant. The probability that a crash requiring deployment of the airbag is occurring may be assed and analyzed relative to the threshold whereby deployment of the airbag is enabled only when the assessed probability is greater than the threshold. The position of the occupant can be determined in any of the ways mentioned above.

A system for controlling deployment of an airbag comprises determining means for determining the position of an occupant to be protected by deployment of the airbag, sensor means for assessing the probability that a crash requiring deployment of the airbag is occurring, and circuit means coupled to the determining means, the sensor means and the airbag for enabling deployment of the airbag in consideration of the determined position of the occupant and the assessed probability that a crash is occurring. The circuit means are structured and arranged to analyze the assessed probability relative to a pre-determined threshold whereby deployment of the airbag is enabled only when the assessed probability is greater than the threshold. Further, the circuit means are arranged to adjust the threshold based on the determined position of the occupant. The determining means may any of the determining systems discussed above Another system for controlling deployment of an airbag comprises a crash sensor for providing information on a crash involving the vehicle, a position determining arrangement for determining the position of an occupant to be protected by deployment of the airbag and a circuit coupled to the airbag, the crash sensor and the position determining arrangement and arranged to issue a deployment signal to the airbag to cause deployment of the airbag. The circuit is arranged to consider a deployment threshold which varies based on the determined position of the occupant. Further, the circuit is arranged to assess the probability that a crash requiring deployment of the airbag is occurring and analyze the assessed probability relative to the threshold whereby deployment of the airbag is enabled only when the assessed probability is greater than the threshold.

Other objects and advantages of the present invention will become apparent from the following description of the preferred embodiments taken in conjunction with the accompanying drawings.

BRIEF DESCRIPTION OF THE DRAWINGS

The accompanying drawings, which are incorporated into and form a part of the specification, illustrate several embodiments of the present invention and, together with the following description, serve to explain the principles of the invention. The drawings are for the purpose of illustrating preferred embodiments of the invention only and are not to be construed as limiting the inventions.

DETAILED DESCRIPTION OF THE PREFERRED EMBODIMENTS

Figure 1:
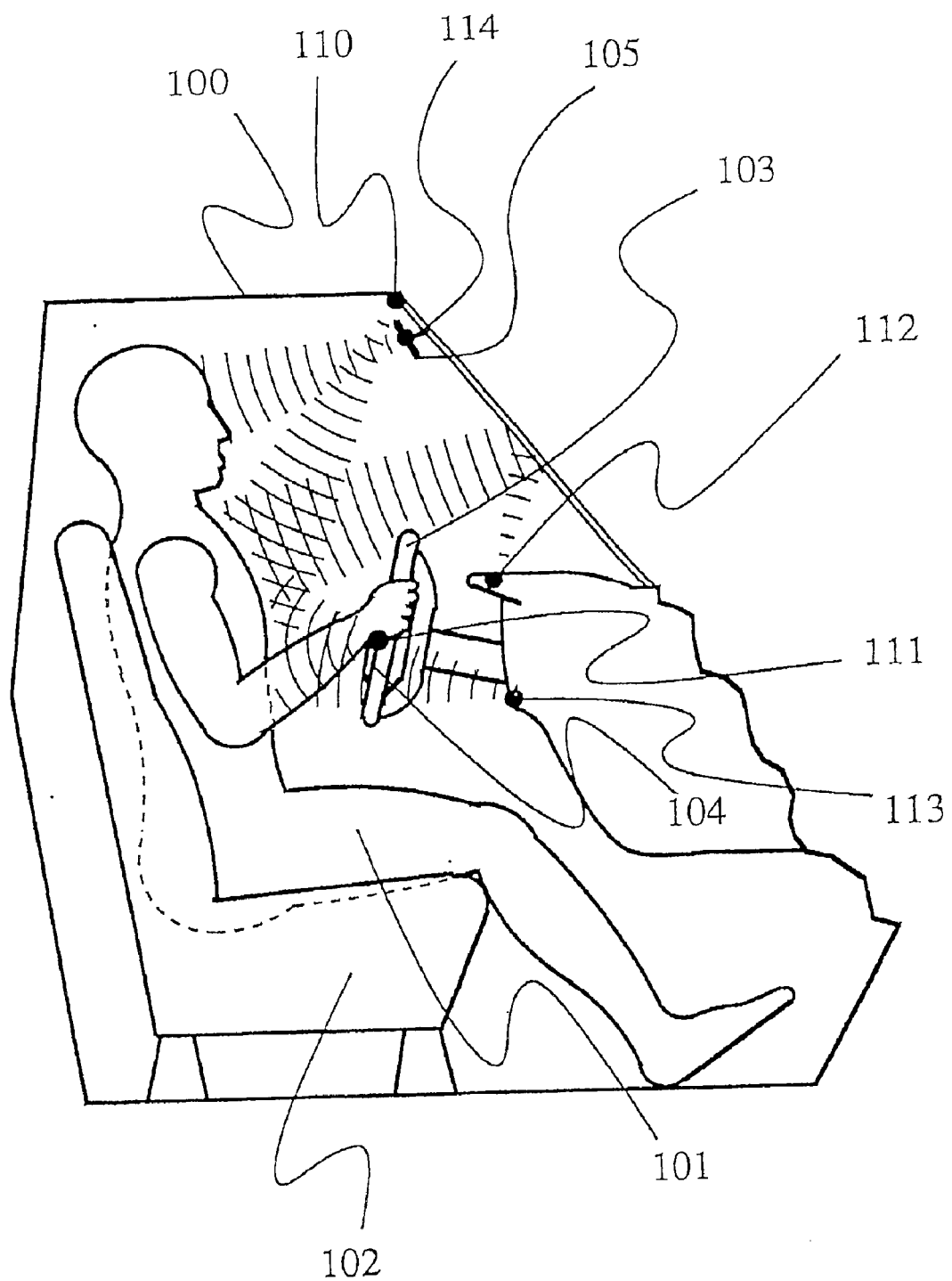
FIG. 1 is a side view, with certain portions removed or cut away, of a portion of the passenger compartment of a vehicle showing several preferred mounting locations of occupant position sensors for sensing the position of the vehicle driver.

Referring now to the drawings, a section of the passenger compartment of an automobile is shown generally as 100 in FIG. 1. A driver of a vehicle 101 sits on a seat 102 behind a steering wheel 103 which contains an airbag assembly 104. Five transmitter and/or receiver assemblies 110, 111, 112, 113 and 114 are positioned at various places in the passenger compartment to determine the location of the head, chest and torso of the driver relative to the airbag. Usually, in any given implementation, only one or two of the transmitters and receivers would be used depending on their mounting locations as described below.

FIG. 1 illustrates several of the possible locations of such devices. For example, transmitter and receiver 110 emits ultrasonic acoustical waves which bounce off the chest of the driver and return. Periodically a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and thereby determines the distance from the transmitter/receiver to the driver based on the velocity of sound. This information is then sent to the crash sensor and diagnostic circuitry which determines if the driver is close enough to the airbag that a deployment might, by itself, cause injury to the driver. In such a case, the circuit disables the airbag system and thereby prevents its deployment. In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises to 95% for a more distant occupant. This aspect of the invention is described in detail below with reference to FIG. 9. Although a driver system has been illustrated, the passenger system would be identical.

In another implementation, the sensor algorithm may determine the rate that gas is generated to affect the rate that the airbag is inflated. In all of these cases the position of the occupant is used to affect the deployment of the airbag either as to whether or not it should be deployed at all, the time of deployment or as to the rate of inflation.

The ultrasonic transmitter/receiver 110 is similar to that used on modem auto-focus cameras such as manufactured by the Polaroid Corporation. Other camera auto-focusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared light can be added to illuminate the driver. In a related implementation, a source of infrared light is reflected off of the windshield and illuminates the vehicle occupant. An infrared receiver 114 is located attached to the rear view mirror 105, as shown in FIG. 1. Alternately, the infrared could be sent by the device 114 and received by a receiver elsewhere. Since any of the devices shown in FIGS. 1 and 3 could be either transmitters or receivers or both, for simplicity, only the transmitted and not the reflected wave fronts are illustrated.

In the above-described system, a lens within receptor 114 captures the reflected infrared light from the head or chest of the driver and displays it onto a charge coupled device (CCD) array. One type of CCD is that used in television cameras to convert an image into an electrical signal. For the purposes herein a CCD will be used to include all devices which are capable of converting light frequencies, including infrared, into electrical signals The CCD is scanned and the focal point of the lens is altered, under control of an appropriate circuit, until the sharpest image of the driver's head or chest results and the distance is then known from the focusing circuitry. The precision of this measurement is enhanced if two receptors are used which can either project images onto a single CCD or on separate CCD's. In the first case, one of the lenses could be moved to bring the two images into coincidence while in the other case the displacement of the images needed for coincidence would be determined mathematically. Naturally, other systems could be used to keep track of the different images such as the use of filters creating different infrared frequencies for the different receptors and again using the same CCD array. In addition to greater precision in determining the location of the occupant, the separation of the two receptors can also be used to minimize the effects of hands, arms or other extremities which might be very close to the airbag. In this case, where the receptors are mounted high on the dashboard on either side of the steering wheel, an arm, for example, would show up as a thin object but much closer to the airbag than the larger body parts and, therefore, easily distinguished and eliminated, permitting the sensors to determine the distance to the occupant's chest. This is one example of the use of pattern recognition.

An optical infrared transmitter and receiver assembly is shown generally at 112 in FIG. 1 and is mounted onto the instrument panel facing the windshield. Although not shown in this view, reference 112 consists of three devices, one transmitter and two receivers, one on each side of the transmitter. In this case the windshield is used to reflect the illumination light, and also the light reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver is determined stereoscopically through the use of the two receivers. In its most elementary sense, this system can be used to measure the distance of the driver to the airbag module. In more sophisticated applications, the position of the driver, and particularly of the drivers head, can be monitored over time and any behavior, such as a drooping head, indicative of the driver falling asleep or of being incapacitated by drugs, alcohol or illness can be detected and appropriate action taken. Other forms of radiation including visual light, radar and microwaves as well as high frequency ultra sound could also be used by those skilled in the art.

Particular mention should be made of the use of radar since inexpensive single axis antennas are now readily available. A scanning radar beam is used in this implementation and the reflected signal is received by a single axis phase array antenna to generate an image of the occupant for input into the appropriate pattern detection circuitry. The word circuitry as used herein includes, in addition to normal electronic circuits, a microprocessor and appropriate software.

Electromagnetic or ultrasonic energy can be transmitted in three modes in determining the position of an occupant. In most of the cases disclosed above, it is assumed that the energy will be transmitted in a broad diverging beam which interacts with a substantial portion of the occupant. This method has the disadvantage that it will reflect first off the nearest object and, especially if that object is close to the transmitter, it may mask the true position of the occupant. This can be partially overcome through the use of the second mode which uses a narrow beam. In this case, several narrow beams are used. These beams are aimed in different directions toward the occupant from a position sufficiently away from the occupant that interference is unlikely. A single receptor could be used providing the beams are either cycled on at different times or arc of different frequencies. Another approach is to use a single beam emanating from a location which has an unimpeded view of the occupant such as the windshield header. If two spaced apart CCD array receivers are used, the angle of the reflected beam can be determined and the location of the occupant can be calculated. The third mode is to use a single beam in a manner so that it scans back and forth or up and down, or in some other pattern, across the occupant. In this manner, an image of the occupant can be obtained using a single receptor and pattern recognition software can be used to locate the head or chest of the occupant. The beam approach is most applicable to electromagnetic energy but high frequency ultra sound can also be formed into a narrow beam.

The windshield header as used herein includes the space above the front windshield including the first few inches of the roof.

A similar effect to modifying the wave transmission mode can also be obtained by varying the characteristics of the receptors. Through appropriate lenses or reflectors, receptors can be made to be most sensitive to radiation emitted from a particular direction. In this manner a single broad beam transmitter can be used coupled with an array of focused receivers to obtain a rough image of the occupant.

Each of these methods of transmission or reception could be used, for example, at any of the preferred mounting locations shown in FIG. 1.

Another preferred location of a transmitter/receiver for use with airbags is shown at 111 in FIG. 1. In this case, the device is attached to the steering wheel and gives an accurate determination of the distance of the driver's chest from the airbag module. This implementation would generally be used with another device such as 110 at another location.

Alternate mountings for the transmitter/receiver include various locations on the instrument panel on either side of the steering column such as 113 in FIG. 1.

The location or position of the occupant can be determined in various ways as noted and listed above and below as well Generally, any type of occupant sensor can be used. Mention is made of some particular occupant sensors which can be used in the systems and methods in accordance with the invention. Specifically, a camera or other device for obtaining images of a passenger compartment of the vehicle occupied by the occupant and analyzing the images can be mounted at the locations of the transmitter and/or receiver assemblies 110–114. The camera or other device may be constructed to obtain three-dimensional images and/or focus the images on one or more optical arrays such as CCDs. Further, a mechanism for moving a beam of radiation through a passenger compartment of the vehicle occupied by the occupant, i.e., a scanning system, can be used. When using ultrasonic or radar waves, the time of flight between the transmission and reception of the waves can be used to determine the position of the occupant. The occupant sensor can also be arranged to receive infrared radiation from a space in a passenger compartment of the vehicle occupied by the occupant. It can also comprise an electric field sensor operative in a seat occupied by the occupant or a capacitance sensor operative in a seat occupied by the occupant. The implementation of such sensors in the invention will be readily appreciated by one skilled in the art in view of the disclosure herein of general occupant sensors for sensing the position of the occupant using waves, energy or radiation.

Also, although some of the devices herein illustrated assume that for the ultrasonic system the same device would be used for both transmitting and receiving waves, there are advantages in separating these functions. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously providing the transmitted signal is modulated in such a manner that the received signal can be compared with the transmitted signal to determine the time it took for the waves to reach and reflect off of the occupant. Many methods exist for this modulation including varying the frequency or amplitude of the waves or by pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant, may be several milliseconds, information as to the position of the occupant is received continuously which permits an accurate, although delayed, determination of the occupant's velocity from successive position measurements. Conventional ultrasonic distance measuring devices must wait for the signal to travel to the occupant and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant located one foot from the transmitter can only be obtained every 2 milliseconds which corresponds to a frequency of 500 cycles per second.

This slow frequency that data can be collected seriously degrades the accuracy of the velocity calculation. The reflection of ultrasonic waves from the clothes of an occupant, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. A potentially more accurate method is to make use of the Doppler effect where the frequency of the reflected waves differs from the transmitted waves by an amount which is proportional to the occupant's velocity. In a preferred embodiment of the present invention, a single ultrasonic transmitter and a separate receiver are used to measure the position of the occupant, by the travel time of a known signal, and the velocity, by the frequency shift of that signal. Although the Doppler effect has been used to determine whether an occupant has fallen asleep as disclosed in the U.S. patent to King referenced above, it has not heretofore been used in conjunction with a position measuring device to determine whether an occupant is likely to become out of position and thus in danger of being injured by a deploying airbag. This combination is particularly advantageous since both measurements can be accurately and efficiently determined using a single transmitter and receiver pair resulting in a low cost system.

Another preferred embodiment of this invention makes use of radio waves and a voltage controlled oscillator (VCO). In this implementation, the frequency of the oscillator is controlled through the use of a phase detector which adjusts the oscillator frequency so that exactly one half wave occupies the distance from the transmitter to the receiver via reflection off of the occupant. The adjusted frequency is thus inversely proportional to the distance from the transmitter to the occupant. Alternately, an FM phase discriminator can be used as known to those skilled in the art. These systems could be used in any of the locations illustrated in FIG. 1.

It was suggested in the U.S. patent to Mattes et al. discussed above, that a passive infrared system could be used to determine the position of an occupant relative to an airbag. Passive infrared measures the infrared radiation emitted by the occupant and compares it to the background. As such, unless it is coupled with a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position. When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 1 as well as others not illustrated.

Passive infrared could also be used effectively in conjunction with a pattern recognition system. In this case, the passive infrared radiation emitted from an occupant can be focused onto a CCD array and analyzed with appropriate pattern recognition circuitry, or software, to determine the position of the occupant. Such a system could be mounted at any of the preferred mounting locations shown in FIG. 1 as well as others not illustrated.

Figure 2:
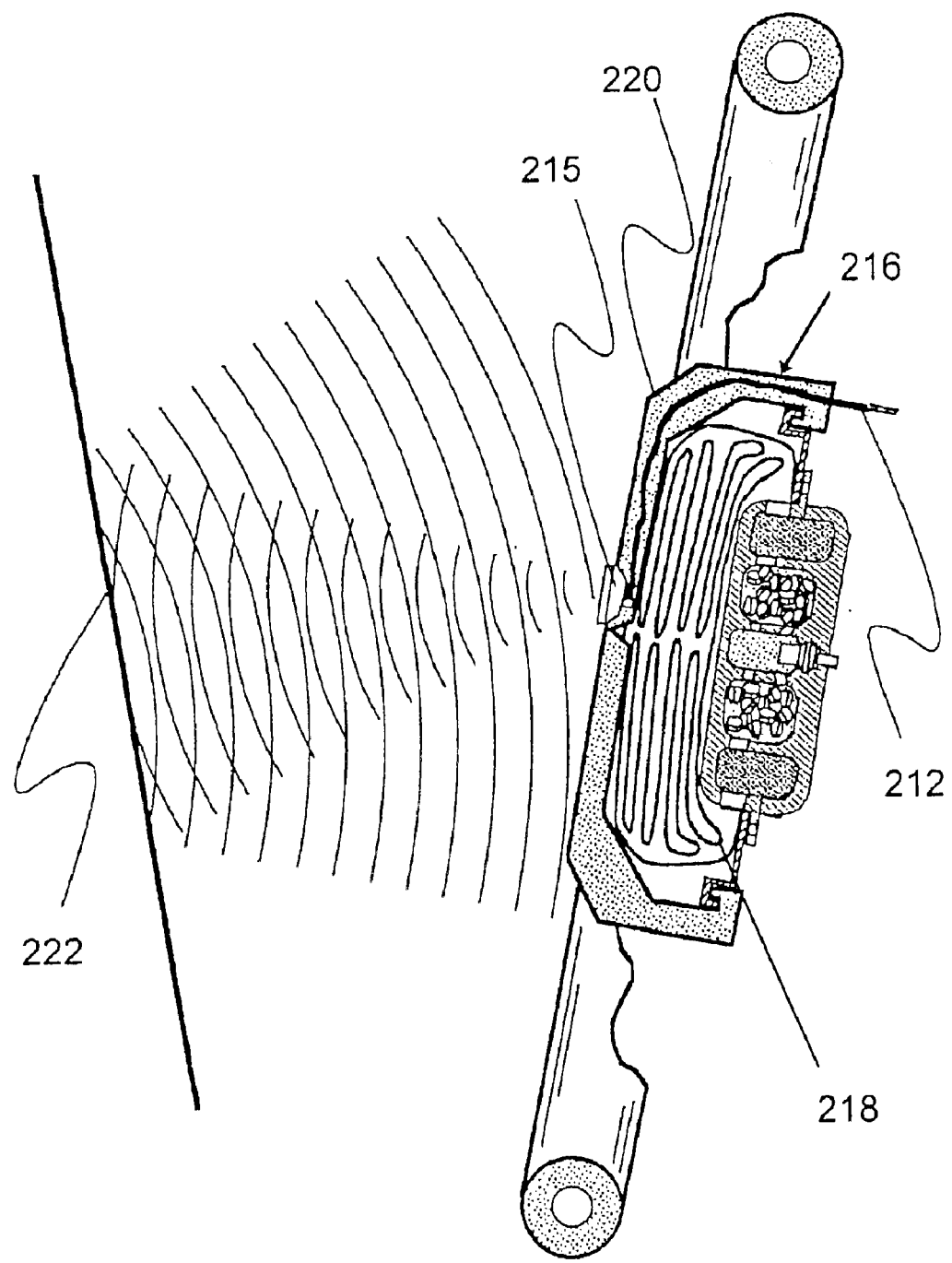
FIG. 2 is a cross section view of a steering wheel and airbag module assembly showing a preferred mounting location of an ultrasonic wave generator and receiver.

A transmitter/receiver 215 shown mounted on the cover 220 of the airbag module 216 is shown in FIG. 2. The transmitter/receiver 215 is attached to various electronic circuitry, not shown, by means of wire cable 212. When an airbag 218 deploys, the cover 220 begins moving toward the driver. If the driver is in close proximity to this cover during the early stages of deployment, the driver can be seriously injured or even killed. It is important, therefore, to sense the proximity of the driver to the cover and if he or she gets too close, to disable deployment of the airbag 218. An accurate method of obtaining this information would be to place the distance measuring device onto the airbag cover 220 as shown in FIG. 2. Appropriate electronic circuitry can be used to not only determine the actual distance of the driver from the cover but also his velocity as discussed above. In this manner, a determination can be made as to where the driver is likely to be at the time of deployment of the airbag 218 This information can be used most importantly to prevent deployment but also to modify the rate of airbag deployment. In FIG. 2, for one implementation, ultrasonic waves are transmitted by a transmitter/receiver 215 toward the chest 222 of the driver. The reflected waves are then received by the same transmitter/receiver 215.

Figure 3:
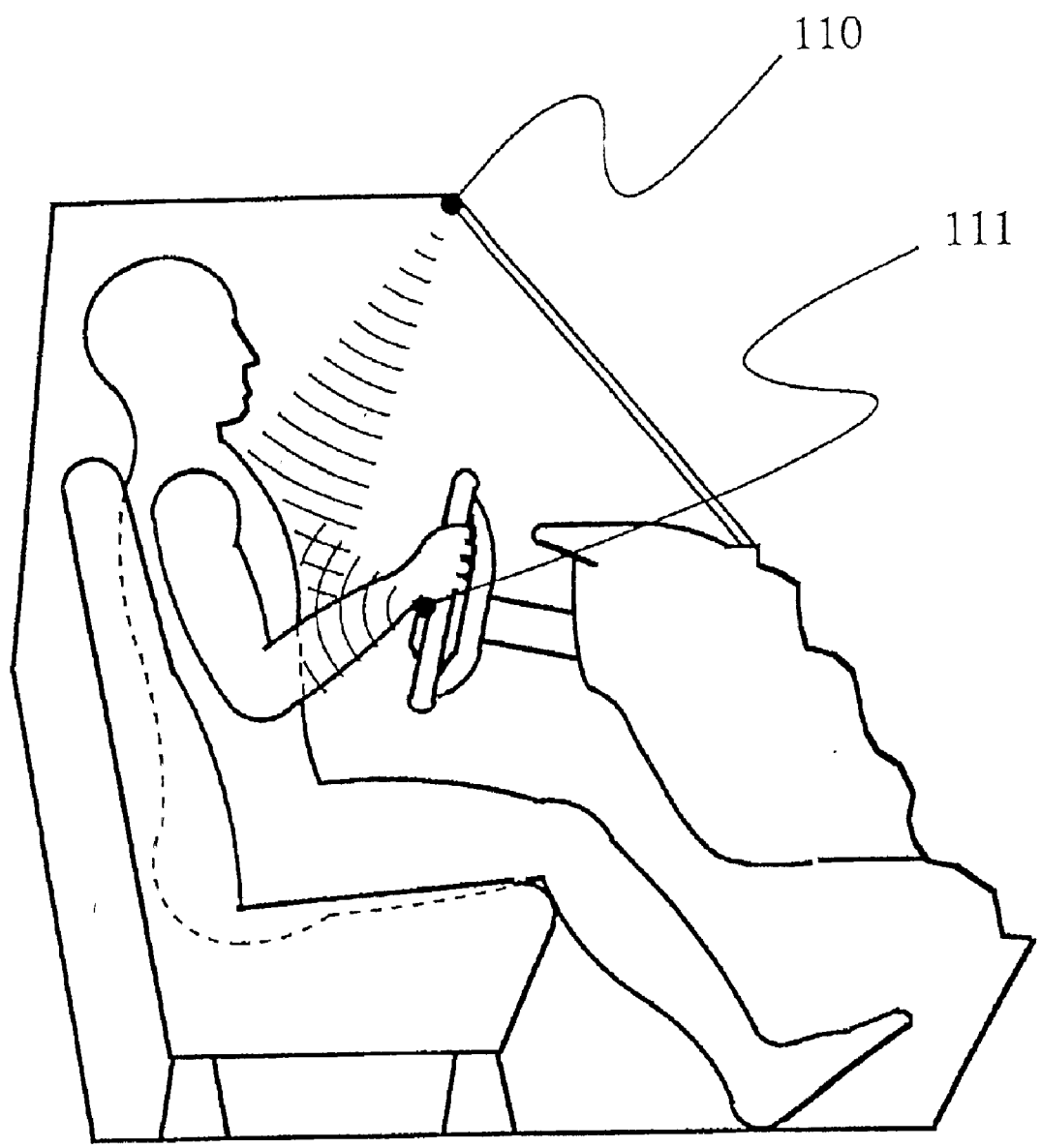
FIG. 3 is a side view, with certain portions removed or cut away, of a portion of the passenger compartment of a vehicle showing preferred mounting locations of the occupant position sensor employing multiple transmitters and receivers.

One problem of the system using a transmitter/receiver 111 in FIG. 1 or transmitter/receiver 215 as shown in FIG. 2 is that a driver may have inadvertently placed his hand over the transmitter/receiver 111 or 215, thus defeating the operation of the device. A second confirming transmitter/receiver 110 is therefore placed at some other convenient position such as on the roof or headliner of the passenger compartment as shown in FIG. 3. This transmitter/receiver 110 operates in a maimer similar to transmitter/receiver 111 and 215.

Figure 4:
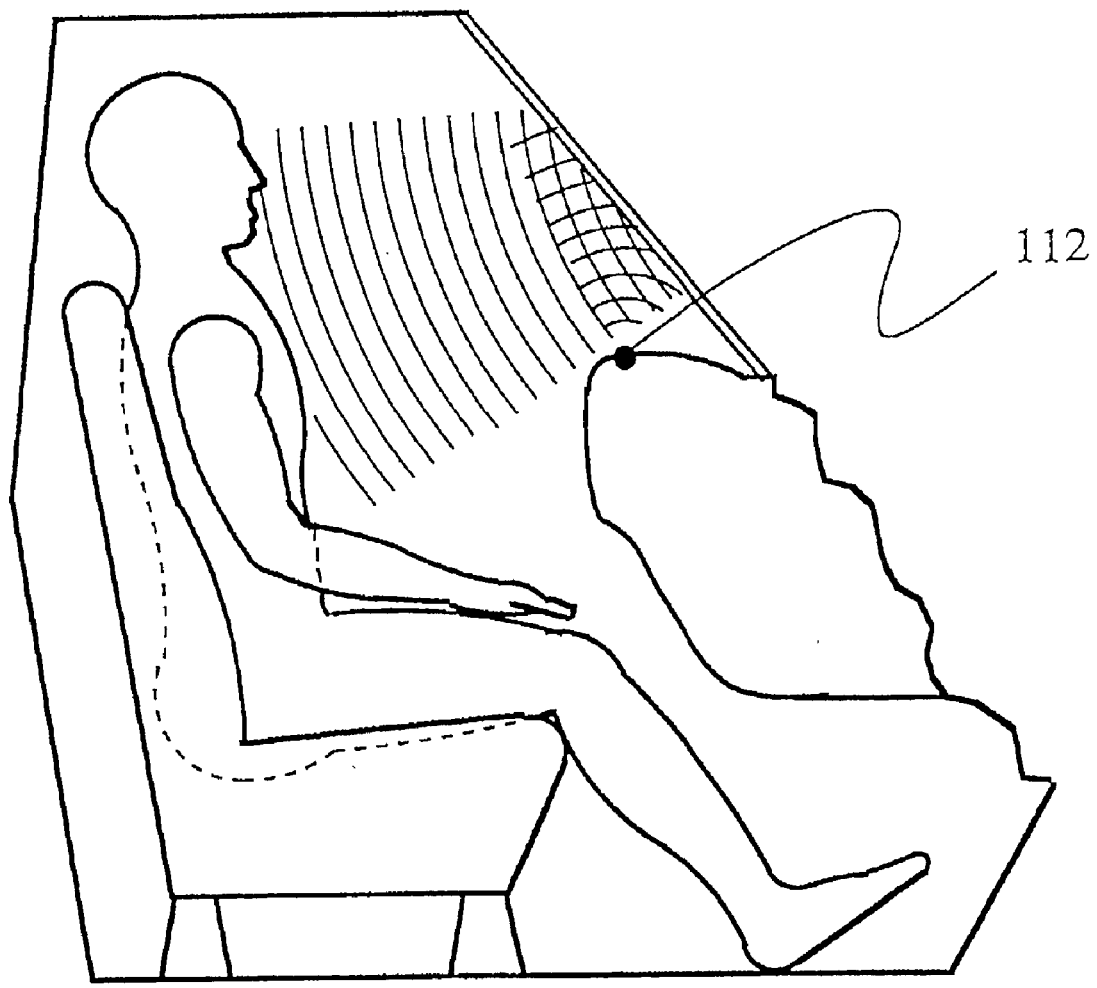
FIG. 4 is a side view, with certain portions removed or cut away, of a portion of the passenger compartment of a vehicle showing an occupant position sensor used in combination with a reflective windshield for sensing the position of the vehicle passenger.

A more complicated and sophisticated system is shown conceptually in FIG. 4 where transmitter/receiver assembly 112 is illustrated. In this case, as described briefly above, an infrared transmitter and a pair of optical receivers are used to capture the reflection of the passenger. When this system is used to monitor the driver as shown in FIG. 4, with appropriate circuitry and a microprocessor, the behavior of the driver can be monitored. Using this system, not only can the position and velocity of the driver be determined and used in conjunction with an airbag system, but it is also possible to determine whether the driver is falling asleep or exhibiting other potentially dangerous behavior by comparing portions of his/her image over time. In this case the speed of the vehicle can be reduced or the vehicle even stopped if this action is considered appropriate. This implementation has the highest probability of an unimpeded view of the driver since he/she must have a clear view through the windshield in order to operate the motor vehicle.

Figure 5:
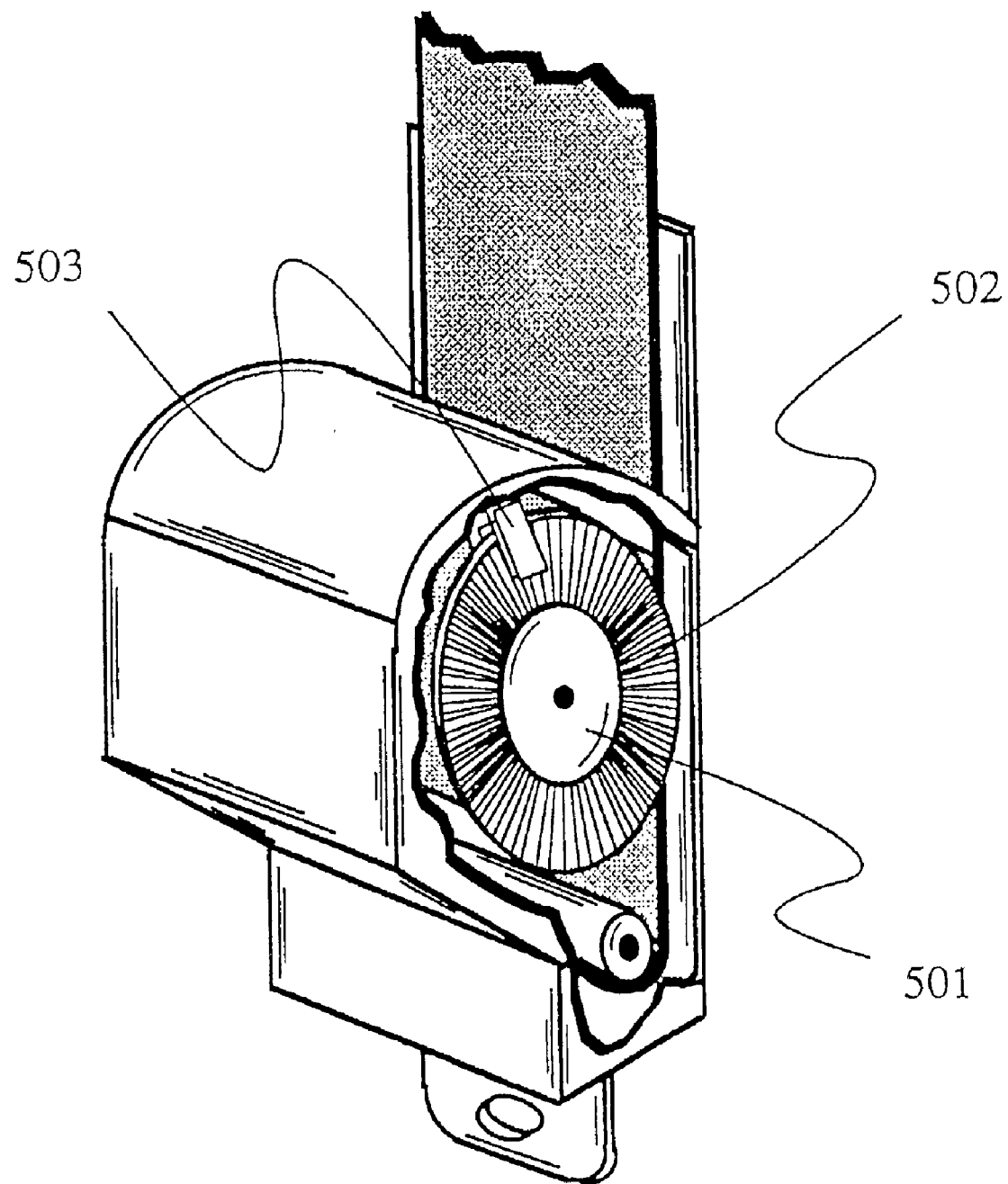
FIG. 5 is a partial cutaway view of a seatbelt retractor with a spool out sensor utilizing a shaft encoder.

As discussed above, a primary object of this invention is to provide information as to the location of the driver, or other vehicle occupant, relative to the airbag, to appropriate circuitry which will process this information and make a decision as to whether to prevent deployment of the airbag in a situation where it would otherwise be deployed, or otherwise affect the time of deployment. One method of determining the position of the driver as discussed above is to actually measure his or her position either using microwaves, optics or acoustics. An alternate approach, which is preferably used to confirm the measurements made by the systems described above, is to use information about the position of the seat and the seatbelt spool out to determine the likely location of the driver relative to the airbag. To accomplish this the length of belt material which has been pulled out of the seatbelt retractor can be measured using conventional shaft encoder technology using either magnetic or optical systems. An example of an optical encoder is illustrated generally as 501 in FIG. 5. It consists of an encoder disk 502 and a receptor 503 which sends a signal to appropriate circuitry every time a line on the encoder disk passes by the receptor.

Figure 6:
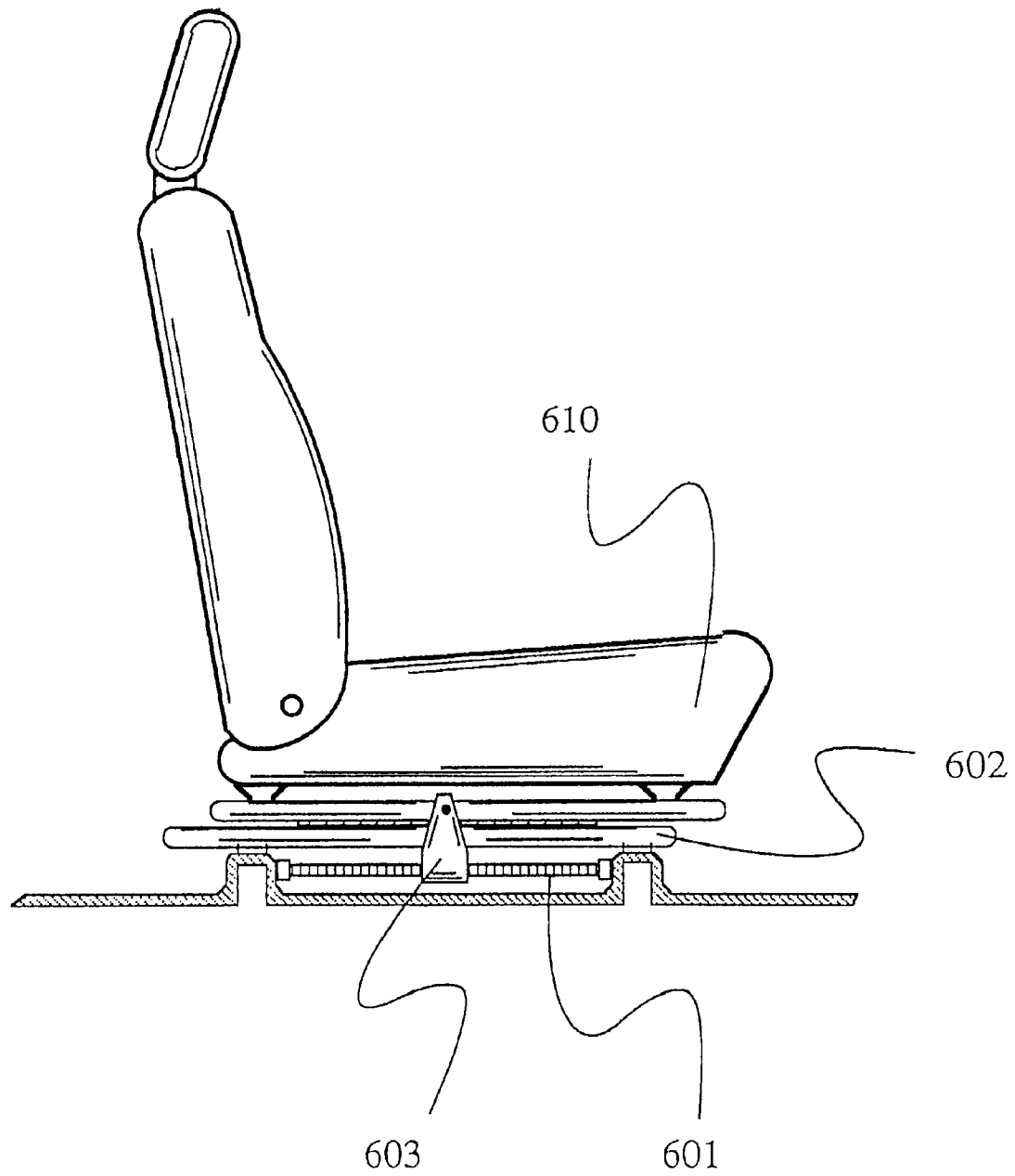
FIG. 6 is a side view of a portion of a seat and seat rail showing a seat position sensor utilizing a potentiometer.

In a similar manner, the position of the seat can be determined through either a linear encoder or a potentiometer as illustrated in FIG. 6. In this case, a potentiometer 601 is positioned along the seat track 602 and a sliding brush assembly 603 is used with appropriate circuitry to determine the fore and aft location of the seat 610. Naturally, for those seats which permit the seat back angle to be adjusted, a similar measuring system would be used to determine the angle of the seat back. In this manner the position of the seat relative to the airbag module can be determined. This information can be used in conjunction with the seatbelt spool out sensor to confirm the approximate position of the chest of the driver relative to the airbag.

For most cases the seatbelt spool out sensor would be sufficient to give a good confirming indication of the position of the occupant's chest regardless of the position of the seat and seat back. This is because the seatbelt is usually attached to the vehicle at least at one end. In some cases, especially where the seat back angle can be adjusted, separate retractors would be used for the lap and shoulder portions of the seatbelt and the belt would not be permitted to slip through the "D-ring". The length of belt spooled out from the shoulder belt retractor then becomes a very good confirming measure of the position of the occupant's chest.

Figure 7:
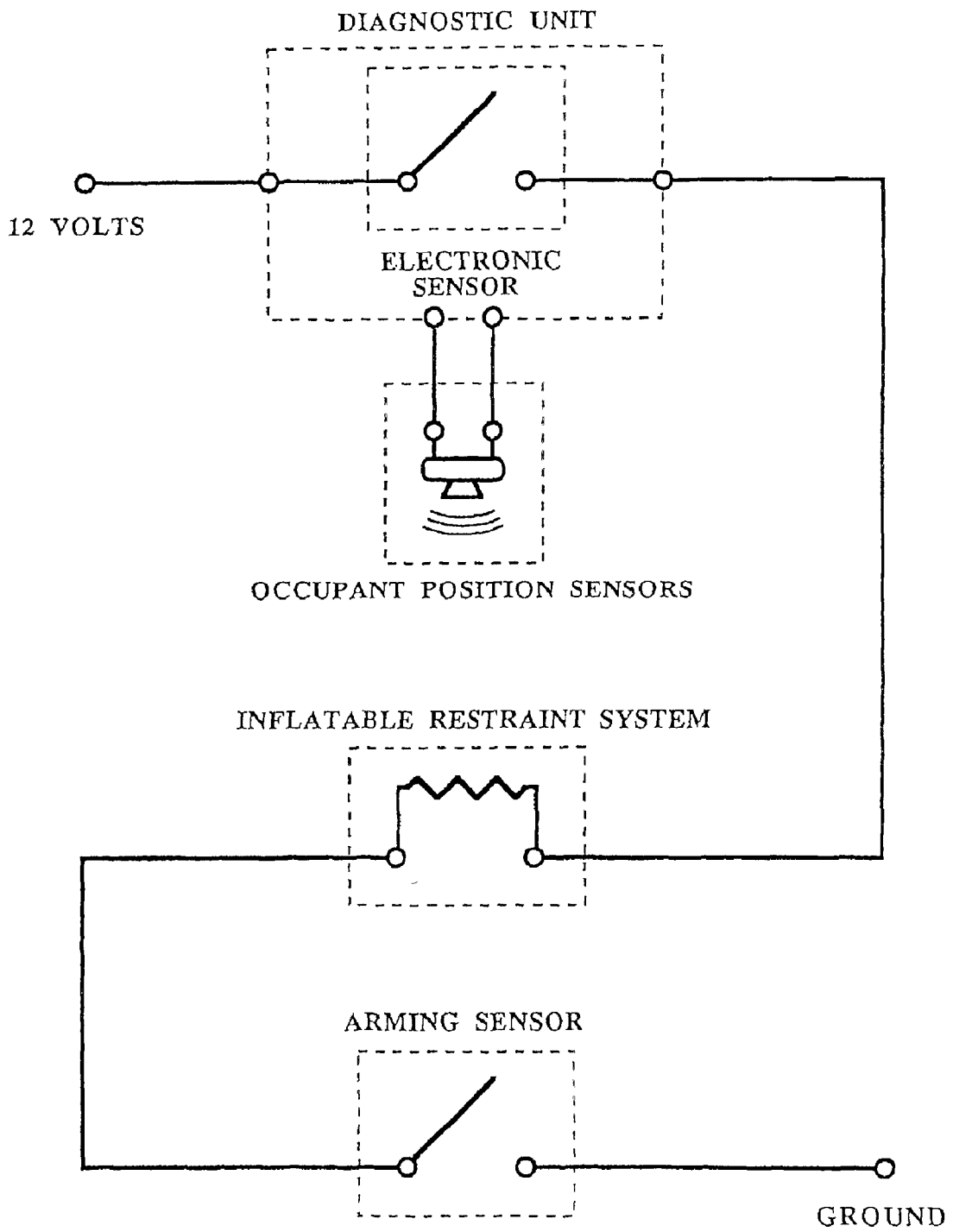
FIG. 7 is a circuit schematic illustrating the use of the occupant position sensor in conjunction with the remainder of the inflatable restraint system.

The occupant position sensor in any of its various forms can be integrated into the airbag system circuitry as shovel schematically in FIG. 7. In this example, the occupant position sensors are used as an input to a smart electronic sensor and diagnostic system. The electronic sensor determines whether the airbag should be deployed based on the vehicle acceleration crash pulse, or crush zone mounted crash sensors, and the occupant position sensor determines whether the occupant is too close to the airbag and therefore that the deployment should not take place.

Figure 8:
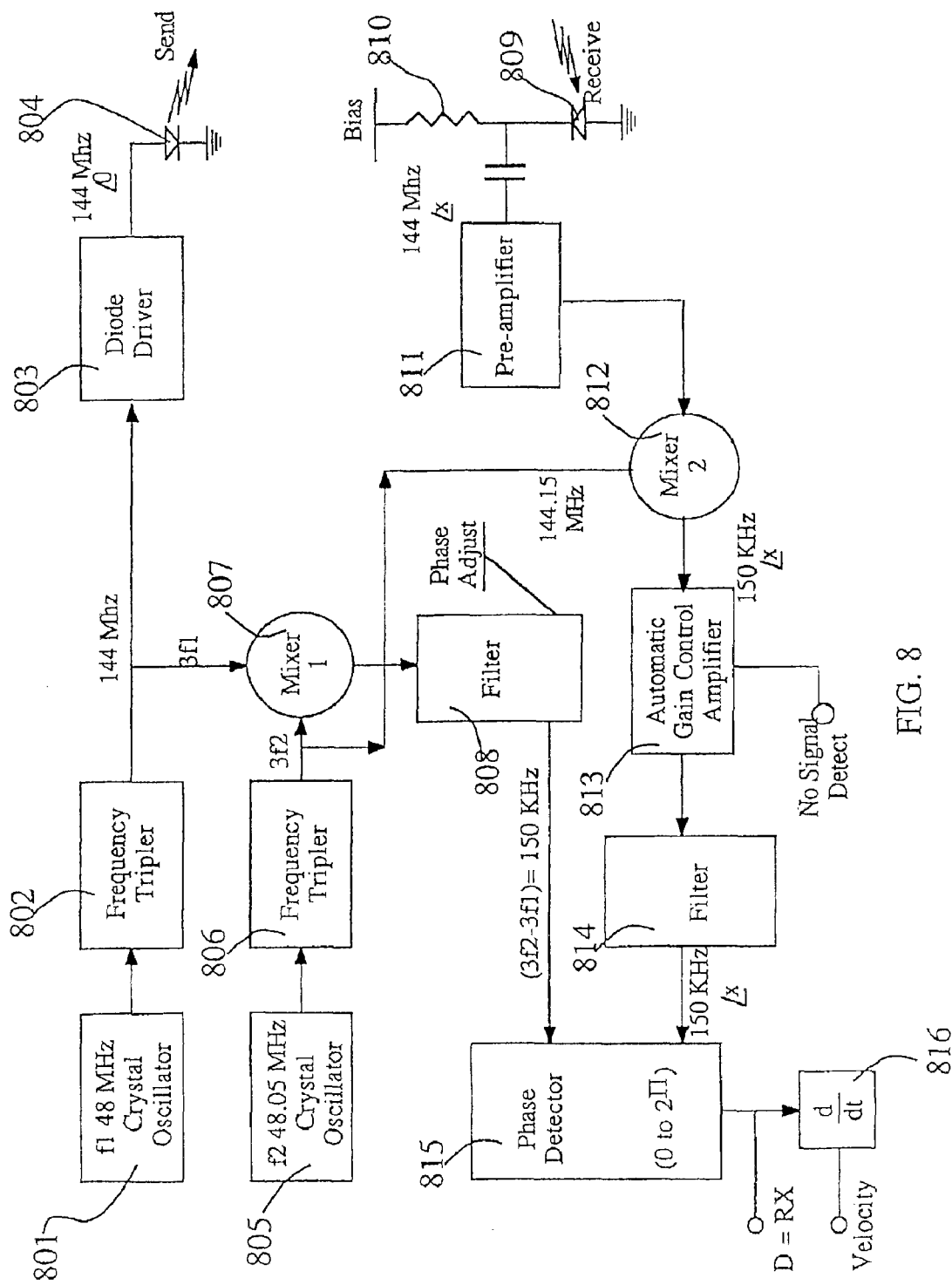
FIG. 8 is a schematic illustrating the circuit of an occupant position-sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 8. The operation is as follows. A 48 MHz signal, f1, is generated by a crystal oscillator 801 and fed into a frequency tripler 802 which produces an output signal at 1.44 MHz. The 1.44 MHz signal is then fed into an infrared diode driver 803 which drives the infrared diode 804 causing it to emit infrared light modulated at 1.44 MHz and a reference phase angle of zero degrees. The infrared diode 804 is directed at the vehicle occupant. A second signal f2 having a frequency of 48 05 MHz, which is slightly greater than f1, is also fed into a frequency tripler 806 to create a frequency of 144.15 MHz. This signal is then fed into a mixer 807 which combines it with the 144 MHz signal from frequency tripler 802. The combined signal from the mixer 807 is then fed to filter 808 which removes all signals except for the difference, or beat frequency, between 3 times f1 and 3 times f2, of 150 kHz. The infrared signal which is reflected from the occupant is received by receiver 809 and fed into pre-amplifier 811. This signal has the same modulation frequency, 144 MHz, as the transmitted signal but now is out of phase with the transmitted signal by an angle x due to the path that the signal took from the transmitter to the occupant and back to the receiver. The output from preamplifier 811 is fed to a second mixer 812 along with the 144 15 MHz signal from the frequency tripler 806. The output from mixer 812 is then amplified by the automatic gain amplifier 813 and fed into filter 814 The filter 814 eliminates all frequencies except for the 150 kHz difference, or beat, frequency in a similar maimer as was done by filter 808. The resulting 150 kHz frequency, however, now has a phase angle x relative to the signal from filter 808. Both 150 kHz signals are now fed into a phase detector 815 which determines the magnitude of the phase angle x. It can be shown mathematically that, with the above values, the distance from the transmitting diode to the occupant is x/345.6 where x is measured in degrees and the distance in meters.

The applications described herein have been illustrated using the driver of the vehicle. Naturally the same systems of determining the position of the occupant relative to the airbag apply to the passenger, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant position sensor, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries, for example. Finally, there has been much written about the out of position child who is standing or otherwise positioned adjacent to the airbag, perhaps due to pre-crash braking. Naturally, the occupant position sensor described herein can prevent the deployment of the airbag in this situation.

Figure 9:
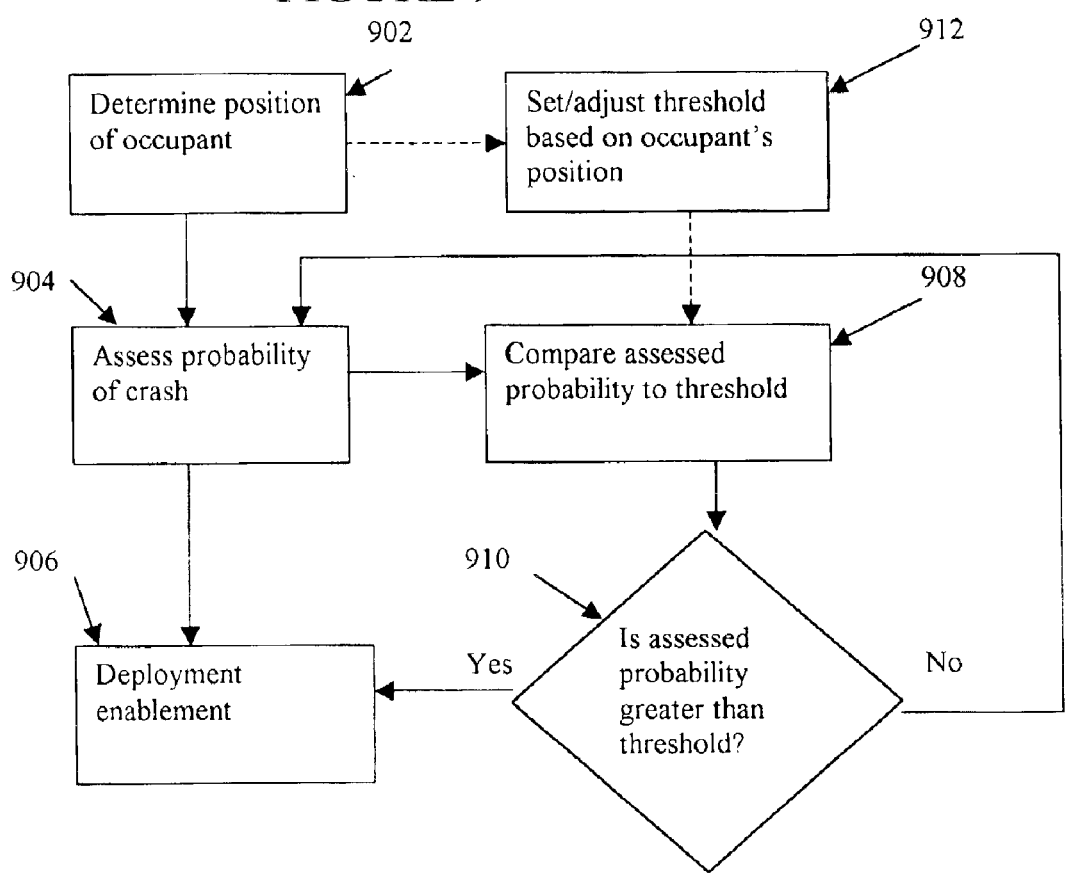
FIG. 9 is a flowchart of a method for controlling an airbag in accordance with the invention.

FIG. 9 shows a flowchart of the manner in which an airbag or other occupant restraint or protection device may be controlled based on the position of an occupant. The position of the occupant is determined at 902 by any one of a variety of different occupant sensing systems including a system designed to receive waves, energy or radiation from a space in a passenger compartment of the vehicle occupied by the occupant, and which also optionally transmit such waves, energy or radiation. A camera or other device for obtaining images, two or three-dimensional, of a passenger compartment of the vehicle occupied by the occupant and analyzing the images may be used. The image device may include a focusing system which focuses the images onto optical arrays and analyzes the focused images. A device which moves a beam of radiation through a passenger compartment of the vehicle occupied by the occupant may also be used, e.g., a scanning type of system. An electric field sensor operative in a seat occupied by the occupant and a capacitance sensor operative in the seat occupied by the occupant may also be used.

The probability of a crash is assessed at 904, e.g., by a crash sensor. Deployment of the airbag is then enabled at 906 in consideration of the determined position of the occupant and the assessed probability that a crash is occurring. A sensor algorithm may be used to receive the input from the crash sensor and occupant position determining system and direct or control deployment of the airbag based thereon. More particularly, in another embodiment, the assessed probability is analyzed, e g, by the sensor algorithm, relative to a pre-determined threshold at 908 whereby a determination is made at 910 if the assessed probability is greater than the threshold. If not, the probability of the crash is again assessed until the probability of a crash is greater than the threshold.

Optionally, the threshold is set or adjusted at 912 based on the determined position of the occupant.

Deployment of the airbag can entail disabling deployment of the airbag when the determined position is too close to the airbag, determining the rate at which the airbag is inflated based on the determined position of the occupant and/or determining the time in which the airbag is deployed based on the determined position of the occupant.

Disclosed above is an airbag system for inflation and deployment of an air bag in front of the passenger during a collision which comprises an air bag, an inflator connected to the air bag and structured and arranged to inflate the air bag with a gas, a passenger sensor system mounted at least partially adjacent to or on the interior roof of the vehicle, and a microprocessor electrically connected to the sensor system and to the inflator. The sensor system continuously senses the position of the passenger and generates electrical output indicative of the position of the passenger. The microprocessor compares and performs an analysis of the electrical output from the sensor system and activates the inflator to inflate and deploy the air bag when the analysis indicates that the vehicle is involved in a collision and that deployment of the air bag would likely reduce a risk of serious injury to the passenger which would exist absent deployment of the air bag and likely would not present an increased risk of injury to the passenger resulting from deployment of the air bag.

The sensor system might be designed to continuously sense position of the passenger relative to the air bag. The sensor system may comprise an array of passenger proximity sensors, each sensing distance from a passenger to the proximity sensor. In this case, the microprocessor determines the passenger's position by determining each of the distances and then triangulating the distances from the passenger to each of the proximity sensors. The microprocessor can include memory in which the positions of the passenger over some interval of time are stored. The sensor system may be particularly sensitive to the position of the head of the passenger.

As to the position of the sensor system, it may be arranged on the rear view mirror, on the roof, on a windshield header of the vehicle, positioned to be operative rearward and/or at a front of the passenger compartment.

Another embodiment of an airbag control system comprises a sensor system mounted adjacent to or on an interior roof of the vehicle and a microprocessor connected to the sensor system and to an inflator of the air bag. The sensor system senses the position of the occupant with respect to the passenger compartment of the vehicle and generates output indicative of the position of the occupant. The microprocessor compares and performs an analysis of the output from the sensor system and activate the inflator to inflate the air bag when the analysis indicates that the vehicle is involved in a collision and deployment of the air bag is desired.

The sensor system may comprise an array of occupant proximity sensors, each sensing distance from the occupant to that proximity sensor. The microprocessor determines the occupant's position by determining each distance and triangulating the distances from the occupant to each proximity sensor. The microprocessor includes memory in which the positions of the occupant over some interval of time are stored. The sensor system may be particularly sensitive to the position of the head of the passenger. As to the position of the sensor system, it may be arranged on the rear view mirror, on the roof, on a windshield header of the vehicle, positioned to be operative rearward and/or at a front of the passenger compartment.

Also disclosed herein is a method of disabling an airbag system for a seating position within a motor vehicle which comprises the steps of providing to a roof above the seating position one or more electromagnetic wave occupant sensors, detecting presence or absence of an occupant of the seating position using the electromagnetic wave occupant sensor(s), disabling the airbag system if the seating position is unoccupied, detecting proximity of an occupant to the airbag door if the seating position is occupied and disabling the airbag system if the occupant is closer to the airbag door than a predetermined distance. The airbag deployment parameters, e.g., inflation rate and time of deployment, may be modified to adjust inflation of the airbag according to proximity of the occupant to the airbag door. The presence or absence of the occupant can be detected using pattern recognition techniques to process the waves received by the electromagnetic wave-occupant sensor(s).

An apparatus for disabling an airbag system for a seating position within a motor vehicle comprises one or more electromagnetic wave occupant sensors proximate a roof above the seating position, means for detecting presence or absence of an occupant of the seating position using the electromagnetic wave occupant sensor(s), means for disabling the airbag system if the seating position is unoccupied, means for detecting proximity of an occupant to the airbag door if the seating position is occupied and means for disabling the airbag system if the occupant is closer to the airbag door than a predetermined distance. Also, means for modifying airbag deployment parameters to adjust inflation of the airbag according to proximity of the occupant to the airbag door may be provided and may constitute a sensor algorithm resident in a crash sensor and diagnostic circuitry. The means for detecting presence or absence of the occupant may comprises a processor utilizing pattern recognition techniques to process the waves received by the electromagnetic wave-occupant sensor(s).

The motor vehicle air bag system for inflation and deployment of an air bag in front of a passenger in a motor vehicle during a collision in accordance with the invention comprises an air bag, inflation means connected to the airbag for inflating the same with a gas, passenger sensor means mounted adjacent to the interior roof of the vehicle for continuously sensing the position of a passenger with respect to the passenger compartment and for generating electrical output indicative of the position of the passenger and microprocessor means electrically connected to the passenger sensor means and to the inflation means. The microprocessor means compare and perform an analysis of the electrical output from the passenger sensor means and activate the inflation means to inflate and deploy the air bag when the analysis indicates that the vehicle is involved in a collision and that deployment of the air bag would likely reduce a risk of serious injury to the passenger which would exist absent deployment of the air bag and likely would not present an increased risk of injury to the passenger resulting from deployment of the air bag. In certain embodiments, the passenger sensor means is a means particularly sensitive to the position of the head of the passenger. The microprocessor means may include memory means for storing the positions of the passenger over some interval of time. The passenger sensor means may comprise an array of passenger proximity sensor means for sensing distance from a passenger to each of the passenger proximity sensor means. In this case, the microprocessor means includes means for determining passenger position by determining each of these distances and means for triangulation analysis of the distances from the passenger to each passenger proximity sensor means to determine the position of the passenger.

There has thus been shown and described an occupant position sensor which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A method for controlling deployment of an airbag, comprising the steps of:

determining the position of an occupant to be protected by deployment of the airbag;

assessing the probability that a crash requiring deployment of the airbag is occurring;

enabling deployment of the airbag in consideration of the determined position of the occupant and the assessed probability that a crash is occurring, said deployment enabling step comprising the steps of analyzing the assessed probability relative to a pre-determined threshold and enabling deployment of the airbag is only when the assessed probability is greater than the threshold; and adjusting the threshold based on the determined position of the occupant.

2. The method of claim 1, wherein the step of determining the position of the occupant comprises the step of receiving waves from a space in a passenger compartment of the vehicle occupied by the occupant.

3. The method of claim 1, wherein the step of determining the position of the occupant comprises the steps of transmitting waves to impact the occupant; receiving waves after impact with the occupant and measuring time between transmission and reception of the waves.

4. The method of claim 1, wherein the step of determining the position of the occupant comprises the steps of obtaining images of a passenger compartment of the vehicle occupied by the occupant and analyzing the images.

5. The method of claim 1, wherein the step of determining the position of the occupant comprises the steps of obtaining images of a passenger compartment of the vehicle occupied by the occupant, focusing the images onto optical arrays and analyzing the focused images.

6. The method of claim 1, wherein the step of determining the position of the occupant comprises the steps of moving a beam of radiation through a passenger compartment of the vehicle occupied by the occupant.

7. The method of claim 1, wherein the step of determining the position of the occupant comprises the steps of transmitting ultrasonic waves to impact the occupant; receiving ultrasonic waves after reflection by the occupant and measuring time between transmission and reception of the waves.

8. The method of claim 1, wherein the step of determining the position of the occupant comprises the step of receiving infrared radiation from a space in a passenger compartment of the vehicle occupied by the occupant.

9. The method of claim 1, wherein the step of determining the position of the occupant comprises the steps of transmitting radar waves to impact the occupant; receiving radar waves after reflection by the occupant and measuring time between transmission and reception of the waves.

10. The method of claim 1, wherein the step of determining the position of the occupant comprises the steps of obtaining three-dimensional images of a passenger compartment of the vehicle occupied by the occupant and analyzing the images.

11. The method of claim 1, wherein the step of determining the position of the occupant comprises the step of arranging an electric field sensor operative in a seat occupied by the occupant.

12. The method of claim 1, wherein the step of determining the position of the occupant comprises the step of arranging a capacitance sensor operative in a seat occupied by the occupant.

13. The method of claim 1, further comprising the step of disabling deployment of the airbag when the determined position is too close to the airbag.

14. The method of claim 1, further comprising the step of determining the rate at which the airbag is inflated based on the determined position of the occupant.

15. The method of claim 1, further comprising the step of determining the time in which the airbag is deployed based on the determined position of the occupant.

16. A method for controlling deployment of an airbag, comprising the steps of:
   determining the position of an occupant to be protected by deployment of the airbag; and adjusting a threshold used in a sensor algorithm based on the determined position of the occupant, the sensor algorithm enabling or suppressing deployment of the airbag.

17. The method of claim 16, further comprising the steps of:
   assessing the probability that a crash requiring deployment of the airbag is occurring;
   analyzing the assessed probability relative to the threshold; and
   enabling deployment of the airbag only when the assessed probability is greater than the threshold.

18. The method of claim 16, wherein the step of determining the position of the occupant comprises the step of receiving waves from a space in a passenger compartment of the vehicle occupied by the occupant.

19. The method of claim 16, wherein the step of determining the position of the occupant comprises the steps of transmitting waves to impact the occupant; receiving waves after impact with the occupant and measuring time between transmission and reception of the waves.

20. The method of claim 16, wherein the step of determining the position of the occupant comprises the steps of obtaining images of a passenger compartment of the vehicle occupied by the occupant and analyzing the images.

21. The method of claim 16, wherein the step of determining the position of the occupant comprises the steps of obtaining images of a passenger compartment of the vehicle occupied by the occupant, focusing the images onto optical arrays and analyzing the focused images.

22. The method of claim 16, wherein the step of determining the position of the occupant comprises the step of moving a beam of radiation through a passenger compartment of the vehicle occupied by the occupant.

23. The method of claim 16, wherein the step of determining the position of the occupant comprises the steps of transmitting ultrasonic waves to impact the occupant; receiving ultrasonic waves after reflection by the occupant and measuring time between transmission and reception of the waves.

24. The method of claim 16, wherein the step of determining the position of the occupant comprises the step of receiving infrared radiation from a space in a passenger compartment of the vehicle occupied by the occupant.

25. The method of claim 16, wherein the step of determining the position of the occupant comprises the steps of transmitting radar waves to impact the occupant; receiving radar waves after reflection by the occupant and measuring time between transmission and reception of the waves.

26. The method of claim 16, wherein the step of determining the position of the occupant comprises the steps of obtaining three-dimensional images of a passenger compartment of the vehicle occupied by the occupant and analyzing the images.

27. The method of claim 16, wherein the step of determining the position of the occupant comprises the step of arranging an electric field sensor operative in a seat occupied by the occupant.

28. The method of claim 16, wherein the step of determining the position of the occupant comprises the step of arranging a capacitance sensor operative in a seat occupied by the occupant.

29. The method of claim 16, further comprising the step of disabling deployment of the airbag when the determined position is too close to the airbag.

30. The method of claim 16, further comprising the step of determining the rate at which the airbag is inflated based on the determined position of the occupant.

31. The method of claim 16, further comprising the step of determining the time in which the airbag is deployed based on the determined position of the occupant.

32. A system for controlling deployment of an airbag, comprising:
   determining means for determining the position of an occupant to be protected by deployment of the airbag;
   sensor means for assessing the probability that a crash requiring deployment of the airbag is occurring; and
   circuit means coupled to said determining means, said sensor means and the airbag for enabling deployment of the airbag in consideration of the determined position of the occupant and the assessed probability that a crash is occurring, said circuit means being structured and arranged to analyze the assessed probability relative to a pre-determined threshold and enable deployment of the airbag only when the assessed probability is greater than the threshold,
   said circuit means being further arranged to adjust the threshold based on the determined position of the occupant.

33. The system of claim 32, wherein said determining means are arranged to receive waves from a space in a passenger compartment of the vehicle occupied by the occupant.

34. The system of claim 32, wherein said determining means are arranged to transmit waves to impact the occupant, receive waves after impact with the occupant and measure the time between transmission and reception of the waves.

35. The system of claim 32, wherein said determining means comprise means for obtaining images of a passenger compartment of the vehicle occupied by the occupant and analyzing the images.

36. The system of claim 32, wherein said determining means comprise means for obtaining images of a passenger compartment of the vehicle occupied by the occupant, focusing the images onto optical arrays and analyzing the focused images.

37. The system of claim 32, wherein said determining means comprise means for moving a beam of radiation through a passenger compartment of the vehicle occupied by the occupant.

38. The system of claim 32, wherein said determining means comprise means for transmitting ultrasonic waves to impact the occupant, receiving ultrasonic waves after reflection by the occupant and measuring time between transmission and reception of the waves.

39. The system of claim 32, wherein said determining means are arranged to receive infrared radiation from a space in a passenger compartment of the vehicle occupied by the occupant.

40. The system of claim 32, wherein said determining means comprise means for transmitting radar waves to impact the occupant, receiving radar waves after reflection by the occupant and measuring time between transmission and reception of the waves.

41. The system of claim 32, wherein said determining means comprise means for obtaining three-dimensional images of a passenger compartment of the vehicle occupied by the occupant and analyzing the images.

42. The system of claim 32, wherein said determining means comprise an electric field sensor operative in a seat occupied by the occupant.

43. The system of claim 32, wherein said determining means comprise a capacitance sensor operative in a seat occupied by the occupant.

44. The system of claim 32, wherein said circuit means are arranged to disable deployment of the airbag when the determined position is too close to the airbag.

45. The system of claim 32, wherein the airbag has an adjustable inflation rate, said circuit means are arranged to determine the rate at which the airbag is inflated based on the determined position of the occupant.

46. The system of claim 32, wherein the airbag has an adjustable deployment time, said circuit means are arranged to determine the time in which the airbag is inflated based on the determined position of the occupant.

47. A system for controlling deployment of an airbag, comprising:
   a crash sensor for providing information on a crash involving the vehicle;
   a position determining arrangement for determining the position of an occupant to be protected by deployment of the airbag; and
   a circuit coupled to the airbag, said crash sensor and said position determining arrangement and arranged to issue a deployment signal to the airbag to cause deployment of the airbag,
   said circuit being arranged to determine a deployment threshold which varies based on the determined position of the occupant and consider the deployment threshold value when deciding whether to issue the deployment signal.

48. The system of claim 47, wherein said circuit is arranged to assess the probability that a crash requiring deployment of the airbag is occurring, analyze the assessed probability relative to the threshold and enable deployment of the airbag only when the assessed probability is greater than the threshold.

49. The system of claim 47, wherein said determining arrangement is arranged to receive waves from a space in a passenger compartment of the vehicle occupied by the occupant.

50. The system of claim 47, wherein said determining arrangement is arranged to transmit waves to impact the occupant, receive waves after impact with the occupant and measure the time between transmission and reception of the waves.

51. The system of claim 47, wherein said determining arrangement comprises means for obtaining images of a passenger compartment of the vehicle occupied by the occupant and analyzing the images.

52. The system of claim 47, wherein said determining arrangement comprises means for obtaining images of a passenger compartment of the vehicle occupied by the occupant, focusing the images onto optical arrays and analyzing the focused images.

53. The system of claim 47, wherein said determining arrangement arrangement comprises means for moving a beam of radiation through a passenger compartment of the vehicle occupied by the occupant.

54. The system of claim 47, wherein said determining arrangement comprises means for transmitting ultrasonic waves to impact the occupant, receiving ultrasonic waves after reflection by the occupant and measuring time between transmission and reception of the waves.

55. The system of claim 47, wherein said determining arrangement is arranged to receive infrared radiation from a space in a passenger compartment of the vehicle occupied by the occupant.

56. The system of claim 47, wherein said determining arrangement comprises means for transmitting radar waves to impact the occupant, receiving radar waves after reflection by the occupant and measuring time between transmission and reception of the waves.

57. The system of claim 47, wherein said determining arrangement comprises means for obtaining three-dimensional images of a passenger compartment of the vehicle occupied by the occupant and analyzing the images.

58. The system of claim 47, wherein said determining arrangement comprises an electric field sensor operative in a seat occupied by the occupant.

59. The system of claim 47, wherein said determining arrangement comprises a capacitance sensor operative in a seat occupied by the occupant.

60. The system of claim 47, wherein said circuit is arranged to disable deployment of the airbag when the determined position is too close to the airbag.

61. The system of claim 47, wherein the airbag has an adjustable inflation rate, said circuit being arranged to determine the rate at which the airbag is inflated based on the determined position of the occupant.

62. The system of claim 47, wherein the airbag has an adjustable deployment time, said circuit being arranged to determine the time in which the airbag is inflated based on the determined position of the occupant.

* * * * *